Figure 1:
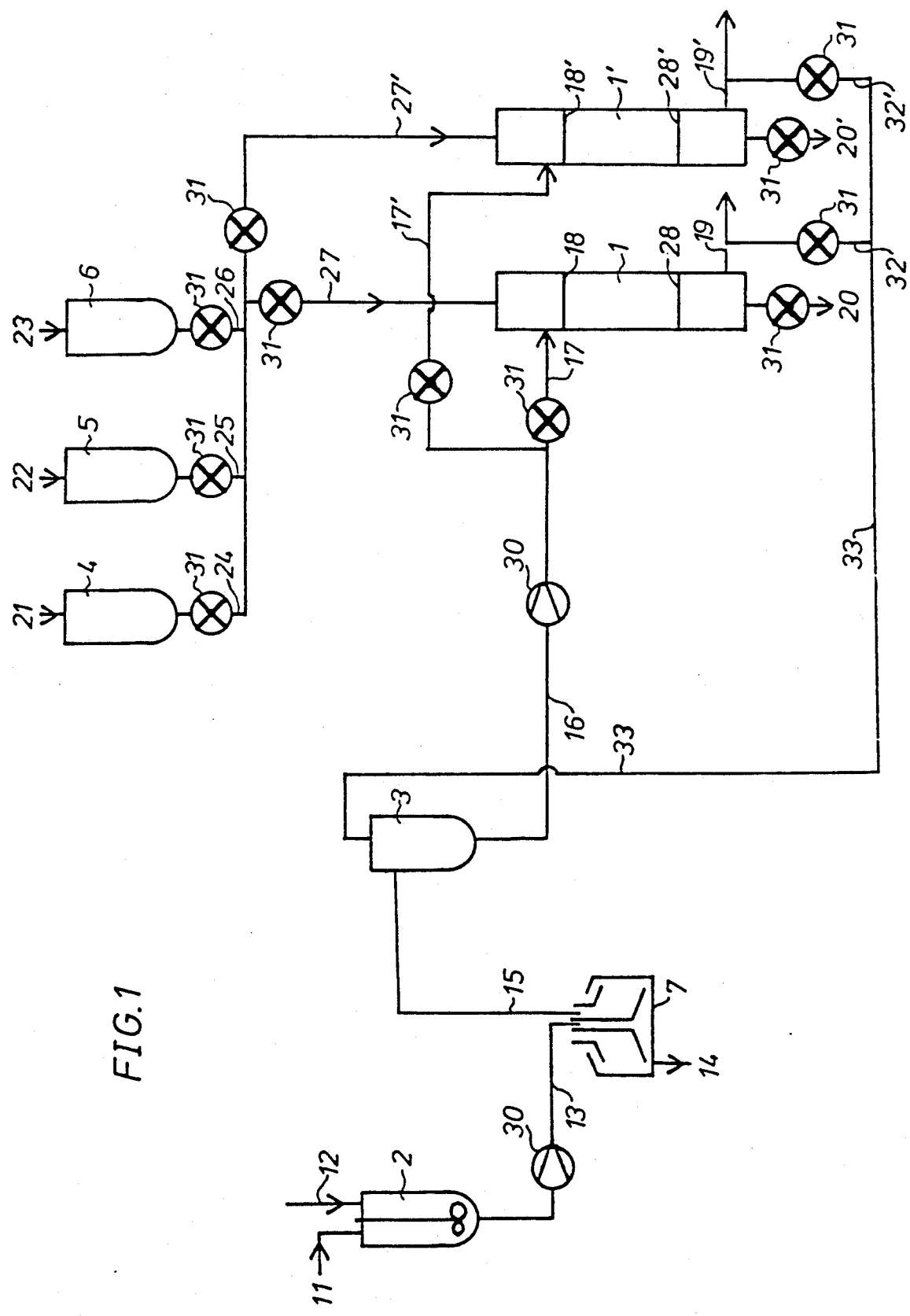

United States Patent [19]
van Dommelen et al.

[11] Patent Number: 5,252,221
[45] Date of Patent: Oct. 12, 1993

[54] METHOD FOR PURIFYING BLOOD PLASMA

[75] Inventors: Frederik S. van Dommelen, Apeldoorn; Hendrikus B. J. Roodink, Twello, both of Netherlands

[73] Assignee: Harimex-Ligos B.V., Netherlands

[21] Appl. No.: 695,814

[22] Filed: May 7, 1991

[30] Foreign Application Priority Data

May 7, 1990 [NL] Netherlands ............ 9001087

[51] Int. Cl.$^5$ .................. B01D 15/00; B01D 61/00
[52] U.S. Cl. ................................. 210/645; 210/670; 210/694; 436/174; 436/178
[58] Field of Search .......... 210/645, 670, 673, 694, 210/742, 743, 805; 426/467; 530/830; 436/174, 175, 178; 424/530

[56] References Cited

U.S. PATENT DOCUMENTS

| | | |
|---|---|---|
| 3,706,660 | 12/1972 | Hagan et al. |
| 3,888,250 | 6/1975 | Hill .................. 210/694 |
| 3,928,630 | 12/1975 | Perini ................ 426/56 |
| 4,358,376 | 11/1982 | Moriuchi et al. ...... 210/282 |
| 4,610,814 | 9/1986 | Dede et al. .......... 426/647 |
| 4,935,204 | 6/1990 | Seidel et al. ........ 604/5 |
| 5,045,210 | 9/1991 | Chen et al. .......... 210/679 |

FOREIGN PATENT DOCUMENTS

| | | |
|---|---|---|
| 0397890 | 11/1990 | European Pat. Off. |
| 1330710 | 5/1963 | France |
| 60-246765 | 12/1985 | Japan |
| 732207 | 5/1980 | U.S.S.R. |

OTHER PUBLICATIONS

Shigeru Hayakawa, Rie Hirai, Hiroyuki Akita, Ryo Nakamura, Yasushi Sato, Suppression Of Off-Flavor Development In Freeze-Dried Plasma During Storage By Charcoal Treatment At Low pH, Nippon Shokuhin Kogyo Gakkaishi, vol. 7, pp. 531–537 (1980).

Masayoshi Saito, Makoto Shimizu, Kunio Yamauchi, Emulsifying Poperties Of Blood Protein, Nippon Shokuhin Kogyo Gakkaishi, vol. 34, No. 4, pp. 223–228 (1987).

Primary Examiner—Robert A. Dawson
Assistant Examiner—Sun Uk Kim
Attorney, Agent, or Firm—Cushman, Darby & Cushman

[57] ABSTRACT

A method for purifying blood plasma by treating said blood plasma with powdery or granular active carbon whereby the purification is carried out continuously by leading the blood plasma, having a pH of 2–5, through a column filled with active carbon, whereby the particle size of said active carbon substantially ranges from 50–500 μm.

8 Claims, 2 Drawing Sheets

METHOD FOR PURIFYING BLOOD PLASMA

The invention relates to a method for purifying blood plasma by treating said blood plasma with powdery or granular active carbon at a pH of less than 7.

From an article of Shigeru Hayakawa et al in Nippon Shokuhin Kogyo Gakkaishi, Vol. 7, (1980) pages 531-537 a method is known for removing the components which give freeze-dried plasma a bad taste, by treating the plasma with active carbon at a low pH. Powdery active carbon having a particle size of 38 μm is thereby added to plasma, and the mixture is stirred for one hour at a temperature of 4° C., after which the mixture is centrifuged.

In a more recent article by Masayoshi Saito et al, published in Nippon Shokuhin Kogyo Gakkaishi, Vol. 4, (1987) pages 223-228 entitled "Emulsifying Properties of Blood Protein" the purification of blood plasma is reported, whereby several processes are carried out; said article also mentions the removal of fat from protein, for which purpose active carbon is added to the plasma to be purified, by stirring the mixture at a pH of 3.0. After stirring for one hour the mixture is centrifuged and filtered in order to remove the active carbon again. The article also reports that as a result of the treatment with active carbon the emulsifying activity of the treated plasma was substantially reduced.

From FR-A-1,330,710 (1963) it is known to obtain stable protein compositions by mixing blood plasma with montmorilloniet (Al2O3.4SiO2.H2O) and then a further purification can be obtained by mixing with powdery active carbon. From U.S. Pat. No. 3,706,660 a process is known for removal of particle-forming proteins from blood serum by extracting the serum with halogenated hydrocarbons such as methylene chloride or chloroform at a pH-value of 5.2 to 5.6. However the use of chemical compounds has to be avoided as much as possible in the purification of blood plasma that later on should be used in the food industry.

There is an increasing need for pure blood plasma for industrial use, viz. blood plasma which has a neutral taste and smell and which has a white colour. Now a method for purifying blood plasma has been discovered, whereby a white powdery plasma having no taste or smell is obtained, and the method according to the invention is characterized in that the purification is carried out continuously by leading the blood plasma, having a pH of 2-5, through a column filled with active carbon, whereby the particle size of said active carbon substantially ranges from 50-500 μm. The active carbon may be regenerated regularly, said regeneration also forming a part of the invention.

From EP-A-38 860 an apparatus for body fluid purification is known which apparatus comprises a vessel filled with activated carbon particles washed with a physiologically acceptable washing solution, which vessel preferably is filled with active carbon particles coated with a water in soluble biocompatible polymeric material, so that only the toxifying substances present in the body fluid are absorbed without adversely affecting the body fluid. Such apparatus for this aim also is known from WPIL/Derwent publications AN-86-024915 and AN-80-91727c. This apparatus is for purifying the body fluid of a patient, such as for an artificial kidney, and not for processing blood plasma on industrial scale to a blood plasma product being free of taste and having no undesirable colour.

Blood from abattoirs has so far been considered as a waste product, although the blood plasma of this blood contains large amounts of usable proteins. Said blood plasma is not used, however, because of its undesirable taste and smell, which is probably caused by aldehydes produced as oxydation products of unsaturated fatty acids, and by hemoglobin which is present, which hemoglobin is in particular important for the colour. Furthermore low-molecular materials and unsaturated fatty acids must be removed from the plasma to be purified.

With the method according to the invention the blood plasma which is used as a starting material is pre-treated with diluted hydrochloric acid, the precipitate produced is separated and said pre-purified plasma is led to the column filled with active carbon. The liquid product obtained from the column, which contains the purified blood plasma, is concentrated and subsequently spray-dried to form a dry, colourless powder having improved organoleptic properties. The regeneration of the column takes place by washing the column filled with active carbon with an alkaline solution at a temperature of preferably 45°-50° C. Then the regenerated carbon is washed with water and acidified again to a pH of 2-5. Preferably a citrate buffer is used for this purpose.

Further parameters that have appeared to be relevant are the residence time and the temperature in the column. The residence time of the plasma to be purified can be regulated by leading the plasma through the column relatively quickly or slowly or, in case of a relatively quick passage, by recirculating the plasma and leading it through the column several times. A residence time of about 4-10 hours in the column leads to the result desired in most embodiments. Further tests have shown that it is preferred to maintain the temperature in the column at 15°-35° C. Below a temperature of 15° C. no adequate purification is obtained within a reasonable residence time, and with a temperature above 35° C. of the protein present in the plasma will give a gel. It is therefore preferred to maintain the temperature in the column at 15°-35° C., which may be considered as an advantage of the present method, because in that case it is mostly possible to work at ambient temperature.

The invention will be explained in more detail with reference to the following examples, wherein reference is made to the drawing, which diagrammatically illustrates the apparatus which is used for carrying out the method according to the invention.

Figure 2:
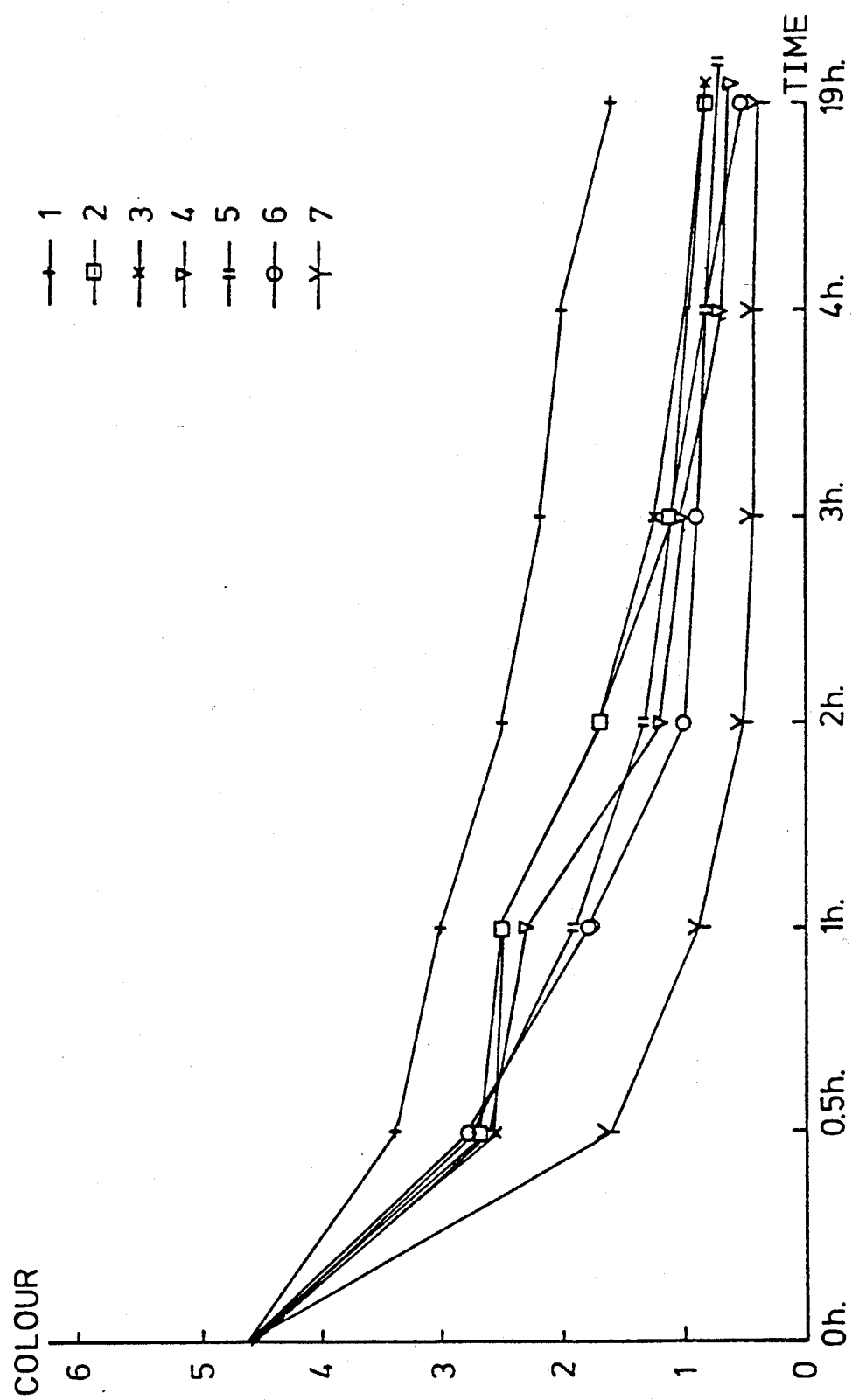

In the drawing:

FIG. 1 diagrammatically illustrates the apparatus which is used in accordance with the invention; and FIG. 2 graphically illustrates the improvement of the colour with the lapse of time, with the particle size of the active carbon as the parameter to be changed.

FIG. 1 diagrammatically illustrates the construction of the equipment in which the method according to the invention can be carried out. In order to be able to carry out the method in a continuous manner in a column 1, which is filled with active carbon that can be regenerated regularly, it is recommended that two columns are connected in parallel, so that when the one column is used for purifying plasma the other column can be regenerated and the method can be carried out in a continuous manner. It will be apparent, however, that it is also possible to use one column or more than two columns. The plasma to be purified, originating from e.g. a slaughterhouse for animals, is supplied to the mixer 2 via the pipe 11, in which mixer the pH of the plasma is adjusted to about 4 by means of a 10% HCl-solution in water, which is supplied via the pipe 12. The precipitate which is thereby produced is removed from the liquid in the centrifuge 7, by supplying the mixture produced in the mixer 2 to the centrifuge 7 by means of the pump 30 and via the pipe 13. From said centrifuge 7 a suspension is removed via the pipe 14, and the aforesaid clear liquid is led to a buffer vessel 3 via the pipe 15, whereby the temperature of the liquid can be raised to a desired value, if necessary. From the vessel 3 the liquid is supplied to the column 1, 1' via the pipe 16 and 17, 17', in which column the actual purification takes place. In order to control the rate of flow of the plasma through the column, and thus the residence time in the column, a pump 30 is incorporated in the pipe 16. The column 1, 1' is filled with active carbon, such as Norit (tradename) having a particle size of 50-500 μm. The column 1, 1' is provided with two plates or sturdy net-shaped means 18, 18' and 28, 28', so as to keep the bad of active coal in place. It will be apparent that the passages in the plates 18 and 28 are attuned to the particle size of the active carbon, in such a manner that no active carbon is carried along with the liquid. In the drawing it is indicated that the flow of the plasma-containing liquid and the regeneration agent through active carbon takes place from the top to the bottom, but it will be apparent that it is also possible for the flow to take place from the bottom to the top. Preferably a temperature of about 25° C. is maintained in the column, for which purpose temperature control equipment (not shown) can be used. The residence time of the blood plasma in the column is preferably 2-10 hours, dependent on the degree of purification of the active carbon, the degree of contamination of the starting material, the temperature, the pH and any other variables. After adsorption of the undesirable smell, colour and taste components to the active carbon the plasma in liquid condition is discharged via the pipe 19, 19', or possibly recirculated via the pipes 32, 32' and 33 to the vessel 3. After having been discharged via the pipe 19, 19' the liquid product is concentrated and subsequently freeze-dried or processed in another manner, such as by spray-drying or ultrafiltration, so as to obtain a white, colourless and tasteless plasma powder. In FIG. 1 valves are indicated as 31 and pumps as 30. The regeneration of the active carbon in the column 1, 1' takes place by means of the liquid supply via the pipe 27, 27'. After the plasma supply to the column 1 has been stopped or has been changed over to the column 1' the active carbon is washed with water which is supplied from the storage vessel 4 and via the pipe 24. Then 1N NaOH is circulated between the storage vessel 5, the pipes 25, 27, the column 1 and the outlet 20 for about 30 minutes. Upon recirculation the liquid discharged via the pipe 20 is resupplied to the storage vessel 5 via the pipe 22. Upon passage of the NaOH-solution the temperature of the column 1 is elevated to 45°-50° C., so as to accelerate the regeneration. Subsequently the alkaline solution is flushed off with water, which is supplied to the column from the storage vessel 4, which storage vessels 4, 5 and 6 may also be provided with temperature control means (not shown). After the alkaline solution has been removed from the column the pH of the active carbon is adjusted again to less than 7 by means of an acid buffer, which is supplied from the storage vessel 6 and via the pipe 26, which liquid may also be recirculated between the storage vessel 6, the pipe 20 and the pipe 23. Preferably a citrate buffer having a pH of 4 is used. The temperature may thereby be lowered again to about 25° C., so that the column can be used again for purifying blood plasma to be supplied.

The invention will be explained in more detail hereafter by means of the following examples.

EXAMPLE I

The column having a height of 20 cm and a diameter of 2.6 cm was filled with 24 g of active carbon (Norit CN-1 (tradename) having a particle size of 250-500 μm). This amount of active carbon corresponds with 106 ml. The openings in the plates 18 and 28 were 50 μm.

Before the column was used it was washed with water.

After having been filtrated and centrifuged a quantity of 600 ml of plasma having a pH adjusted to 4.0 by means of a 10% HCl-solution in water, was supplied to the column at a flow rate of 30 ml/min. After a quantity of water has first been displaced from the column, after 60 ml, protein exits from the column, which protein is recirculated in the column at a rate of 30 ml/min. The temperature was maintained at 25° C.

The quality of the plasma was evaluated as to colour. Said colour is assigned to a class ranging from 0-6, whereby 0 is the best colour and whereby 6 corresponds with the poorest colour value. The plasma supplied, which is used as a starting material, has a colour value of 3.3.

Table A shows what colour is obtained for the final product dependent on the time.

TABLE A

| time (hours) | 0 | 1 | 4 | 5 | 8 | 9 | 12 | 16 | 20 |
|---|---|---|---|---|---|---|---|---|---|
| color | 3.3 | 2.3 | 1.2 | 1 | 1 | 0.9 | 0.8 | 0.75 | 0.7 |

Further tests show that a finer grain size leads to a better final product within a shorter time, but by using a finer powder clogging will sooner occur and there is a larger pressure drop in the column. With the embodiment according to Example I the pressure drop is 2.5 bar in the system and 0.7 bar in the column.

EXAMPLE II

In order to study the influence of the grain size of the active carbon on the quality of the final product the active carbon was pretreated as indicated in Example I, whereby the column was each time filled with another fraction of active carbon, however. The plasma was led through without recirculation, and the time duration was regulated by varying the flow rate.

The fractions used thereby are the following:

| 1: | coarse granuls (>500 μm) | granules |
|---|---|---|
| 2: | 500-250 μm | granules |
| 3: | 250-100 μm | granules |
| 4: | 150-90 μm | powder |
| 5: | 90-75 μm | powder |
| 6: | 75-50 μm | powder |
| 7: | <50 μm | powder |

The colours were determined after a residence time of 0.5 and 1- 2- 3- 4 and 19 hours respectively, whereby about 50 ml of liquid plasma has been obtained after 4 hours.

The data as obtained are summarized in Table B

TABLE B

| fraction | color as a function of the residence time | | | | | | |
|---|---|---|---|---|---|---|---|
| | 0 h | 0.5 h | 1 h | 2 h | 3 h | 4 h | 19 h |
| 1 | 4.6 | 3.4 | 3 | 2.5 | 2.2 | 2 | 1.6 |
| 2 | 4.6 | 2.7 | 2.5 | 1.7 | 1.1 | — | 0.8 |
| 3 | 4.6 | 2.6 | 2.5 | 1.7 | 1.2 | — | 0.8 |
| 4 | 4.6 | 2.6 | 2.3 | 1.2 | 1 | 0.7 | 0.6 |
| 5 | 4.6 | 2.7 | 1.9 | 1.3 | 1.1 | 0.8 | 0.7 |
| 6 | 4.6 | 2.8 | 1.8 | 1.0 | 0.9 | 0.8 | 0.5 |
| 7 | 4.6 | 1.6 | 0.9 | 0.5 | 0.4 | 0.4 | 0.4 |

The data of Table B are graphically illustrated in FIG. 2.

The data of Table B show that the finer fractions yield better results than the fractions of the larger particles. Fraction 7 indeed yields the best results as regards to colour, but the particles which are smaller than 50 $\mu$m make it less economic to carry out the process. The fraction having particles larger than 500 $\mu$m yield a substantially poorer result after 1 hour, and certainly after 19 hours, than the fractions of which the particles are substantially smaller than 500 $\mu$m.

The graph furthermore shows that when the plasma to be purified was led through for more than 4 hours, dependent on the flow rate, the result obtained was hardly any better.

EXAMPLE III

The influence of the residence time in the column on the colour of the plasma was again determined by repeating the method of Example I, in this case using active carbon having a particle size smaller than as used in Example I, however.

The active carbon used was Norit CN-1 (tradename) having a particle diameter of 50-75 $\mu$m. The column was maintained at a temperature of 25° C. The flow rate was set at 30 ml/min. The pressure drop in the entire system was 3.2 bar and the pressure drop in the column was 1.4 bar. The colour measured after recirculating for a number of hours is shown in Table C.

TABLE C

| time (hours) | 0 | 1 | 2 | 3 | 4 | 6 | 10 | 14 | 21 |
|---|---|---|---|---|---|---|---|---|---|
| color | 3.6 | 2.1 | 1.8 | 1.5 | 1.5 | 1.2 | 0.8 | 0.6 | 0.5 |

The data of this Table C again demonstrate that recirculating provides a good possibility to lengthen the residence time and to obtain the desired colour of the plasma produced within about 12 hours. After 4 hours about 600 ml of plasma have been recirculated.

EXAMPLE IV

The method of Example III was repeated, whereby it was determined what purifying action can be obtained by means of a regenerated column. After 4 hours of recirculation the colour was determined and the column was regenerated. During said regeneration the temperature was maintained at the same value as during the recirculation, i.e. at 25° C.

The regeneration was carried out as follows. The plasma was removed from the column by leading through 300 ml of water. Then 300 ml of 0.5M NaOH was recirculated. Subsequently the NaOH was removed by washing with 300 ml of water and after that 600 ml of 0.8% citrate buffer having a pH of 4 was led through.

The plasma which was used as a starting material had a colour value of 3.3 and after 4 hours the colour had been put at a value of 1.2.

After regenerating six times the colour of the plasma after 4 hours of recirculation was still 1.2. After the seventh and eighth regeneration the colour value was 1.4, whilst after the eighth regeneration the colour value ran up to 1.6 and 1.7. After the eleventh regeneration an additional purification using an alkaline solution was carried out at a temperature of 45° C. As a result of the purification at an elevated temperature a more active carbon type was obtained, where regenerations 14-17 led to a colour of 1.1, which colour value slowly increased to 1.2 until the twenty-second regeneration. From this it appears that the column can be regenerated at least 22 times, without decreasing the activity of the active carbon. About halfway it is indeed necessary for the regeneration to be carried out at a higher temperature, viz. about 50° C.

EXAMPLE V

The method of Example III was repeated, whereby in this case the temperature of the column was changed, however, in order to determine the influence of the temperature on the activity of the active carbon. The temperature of the column was changed so that the purification was carried out at 15°, 25°, 30° and 35° C. respectively. It became apparent thereby that with a column temperature of 15° C. the purification only took place slowly, which means that after 4 hours the colour had a value of about 2, whereas at 25° C. the colour had a value of 1.5 after 4 hours. With the temperatures of 25°, 30° and 35° C. the purification was found to be substantially as fast, at a temperature above 35° C., however, a slight degree of gelling took place in the protein, so that it is recommended not to carry out the purification at a temperature above 35° C. The results of this example indicate that the temperature of the column during the purification is not critical within the range of 25°-35° C.

We claim:

1. A method for purifying blood plasma employing the steps of obtaining a supply of blood plasma, pretreating the blood plasma supply to establish a blood pH level ranging from 2-5, passing the supply of pretreated blood plasma through a column filled with active carbon in which the particle size of the active carbon ranges from about 50 to about 500 $\mu$m, collecting purified blood plasma, periodically stopping the passing of the supply of blood plasma through the column and regenerating the active carbon column by successively washing the active carbon with an alkaline solution at a temperature of 45°-50° C. and then treating the column with an acid solution to bring the pH of the active carbon to at least neutral.

2. The method according to claim 1 wherein the blood plasma is pretreated with diluted hydrochloric acid thereby producing a precipitate, separating out and removing the precipitate yielding a pre-purified plasma and passing the pre-purified plasma to the column.

3. The method according to claim 1 wherein purification is carried out at a column temperature ranging from about 15° to about 35° C.

4. The method according to claim 1 including the further step of recirculating the blood plasma through the column other than during regeneration.

5. The method according to claim 1, including the additional steps of concentrating the blood plasma obtained from the active carbon column and evaporating the concentrated blood plasma to dryness forming a dry, colorless powder.

6. The method according to claim 1 including the additional step during regeneration of the active carbon of flushing the alkaline solution by passing water through the column prior to the acid treatment.

7. The method according to claim 1 wherein following the washing with an alkaline solution the column is brought to a pH of 2 to 5 by use of a buffered solution.

8. The method according to claim 7 wherein a citrate buffer is used.

* * * * *